United States Patent [19]

Gliemeroth et al.

[11] Patent Number: 4,508,834
[45] Date of Patent: Apr. 2, 1985

[54] SPECTACLE GLASS WITH INCREASED REFRACTIVE INDEX

[75] Inventors: Georg Gliemeroth, Mainz-Finthen; Ludwig Ross, Klein-Winternheim; Burkhard Speit, Mainz-Momback; Volkmar Geiler, Mainz-Finthen; Hans-Georg Krolla, Mainz; Lothar Meckel, Oestrich-Winkel, all of Fed. Rep. of Germany

[73] Assignee: Schott Glaswerke, Mainz, Fed. Rep. of Germany

[21] Appl. No.: 465,410

[22] Filed: Feb. 10, 1983

[30] Foreign Application Priority Data

Feb. 10, 1982 [DE] Fed. Rep. of Germany ....... 3204625

[51] Int. Cl.³ .......................... C03C 3/04; C03C 3/02; C03C 3/16
[52] U.S. Cl. ......................................... 501/73; 501/77; 501/79; 501/903
[58] Field of Search ...................... 501/73, 77, 79, 78, 501/903, 901, 64

[56] References Cited

U.S. PATENT DOCUMENTS

| | | | |
|---|---|---|---|
| 3,876,436 | 4/1975 | Lythgoe | 501/903 X |
| 3,898,093 | 8/1975 | Faulstich et al. | 501/64 |
| 4,088,501 | 5/1978 | Ellis et al. | 501/73 X |
| 4,102,693 | 7/1978 | Owen et al. | 501/77 X |
| 4,304,584 | 12/1981 | Borrelli et al. | 501/77 X |

Primary Examiner—Howard S. Williams
Attorney, Agent, or Firm—Millen & White

[57] ABSTRACT

A spectacle glass which is colorless in the visible spectrum range, not transmissive in the ultraviolet spectrum range below 350 nm, has a refractive index $n_d$ higher than 1.56 and an Abbe number of more than 45, and which has an extremely low density, has the following composition (in % by weight):

| | |
|---|---|
| 12–40 | $P_2O_5$ |
| 13–34 | $Al_2O_3$ |
| 8–30 | $SiO_2$ |
| 0–16 | $B_2O_3$ |
| 4–12 | $TiO_2$ |
| 0–4 | $ZrO_2$ |
| 2–18 | $CaO$ |
| 0–4 | $MgO$ |
| 0–15 | $Na_2O$ |
| 0–11 | $K_2O$ |
| 0–6 | $Li_2O$ |
| 0–12 | $Nb_2O_5$ |
| 0–8 | $ZnO$. |

9 Claims, No Drawings

SPECTACLE GLASS WITH INCREASED REFRACTIVE INDEX

BACKGROUND OF THE INVENTION

The present invention relates to a spectacle glass with an Abbe-number greater than 45 and a refractive index greater than 1.56, particularly distinguished by its very low density.

Current commercially available spectacle glass which is colorless in the visible spectrum range, has a refractive index $n_d$ of approximately 1.523, an Abbe-number of about 56 and a density of at least 2.55 gcm$^{-3}$. Plastic material which is also in common use for spectacle lenses has a refractive index of 1.500, an Abbe-number of 58 and a density of 1.32 gcm$^{-3}$. The demand for an inorganic spectacle glass with a higher refractive index as compared with the currently common refractive index of 1.523 has been somewhat satisfied by the glasses of DE-PS 22 59 183.

Such inorganic glasses, particularly as compared with the spectacle glass with $n_d$ of 1.523 and even more so in comparison with the plastic material, have the great advantage of permitting, for the same diopter in a corrective prescription, significantly slimmer peripheral thicknesses in negative lenses and significantly thinner central thicknesses in positive lenses. They are therefore more attractive to the spectacle-wearer from the important aspect of cosmetic appearance. The density increase which is normally proportional to refractive-index increase can be relatively restricted but in most cases it is not possible to go below a density of 3.0 gcm$^{-3}$.

These glasses are particularly suitable for lens prescriptions in the higher positive or negative diopter ranges, normally over ±2.5 dpt.

On the other hand, the majority of correction prescriptions fall within the range between +2.5 dpt and −2.5 dpt. Within this range, the two curves of a spectacle lens (the outside curve and the inside curve facing the eye) are not excessively dissimilar so that the higher refractive indices cannot have their beneficial effect while the relatively higher density of inorganic lenses is felt to be a distinct disadvantage by comparison with plastic lenses.

SUMMARY OF THE INVENTION

It is therefore an object of the present invention to provide an extremely light-weight glass for spectacle lenses with a density below that of conventional spectacle glass of 2.65 gcm$^{-3}$, but which, despite its low weight, has a refractive index which is significantly higher than that of conventional spectacle glass of $n_d = 1.523$.

It is another object of this invention to provide such a glass with an Abbe number higher than or equal to about 45 because it has been found that below this Abbe number, visible color fringes, resulting from the differential dispersion of discrete light wavelengths, interfere with the trouble-free vision of the wearer of such spectacles.

It is a further object of this invention to provide such a new glass for spectacle lenses which does not transmit in the ultraviolet range of the spectrum to wavelengths below 350 nm because recent discoveries in the field of opthalmics have proved the harmful nature of wavelengths below 350 nm to the human eye.

It is an additional object of this invention to provide a new glass for spectacle lenses which is capable of having its mechanical strength improved by chemical hardening because in many cases, chemical hardening treatment not only provides lenses which have greater resistance to flexural stress but also because the fracture pattern of a shattered lens which has previously been subjected to chemical hardening treatment is considerably less dangerous than that of a plastic lens having similar flexural stress resistance.

It is yet another object of this invention to provide such a new glass having a composition for spectacle lenses which can be produced in currently commonly used spectacle glass tanks, i.e., of a viscosity having a defined temperature-related curve and of a tendency to crystallization which is as low as possible, whereby the precise apportioning of glass batches by shear-cut for automatic rotary table presses will raise no problems.

It is yet a further essential object of this invention that the glass have a superior chemical stability whereby aggressive media such as acids and the like which are applied in finishing treatment of the lenses by grinding, polishing and washing as well as during future use of the glass in spectacle lenses, will not, or at least not significantly attack the glass surface.

Upon further study of the specification and appended claims, further objects and advantages of this invention will become apparent to those skilled in the art.

All of these objects have been achieved by this invention by providing a new spectacle lens glass which has the following composition (in % by weight):

|  |  | Preferred |
|---|---|---|
| $P_2O_5$ | 12 to 40 | 12 to 34 |
| $Al_2O_3$ | 13 to 34 | 21 to 29 |
| $SiO_2$ | 8 to 30 | 10 to 24 |
| $B_2O_3$ | 0 to 16 | 0 to 15 |
| $ZrO_2$ | 0 to 4 | 0 to 3 |
| $TiO_2$ | 3 to 12 | 5 to 11 |
| CaO | 2 to 18 | 6 to 12 |
| MgO | 0 to 4 | 0 to 2 |
| $Na_2O$ | 0 to 15 | 1 to 15 |
| $K_2O$ | 0 to 11 | 1 to 10 |
| $Li_2O$ | 0 to 6 |  |
| $Nb_2O_5$ | 0 to 12 | 1 to 12 |
| ZnO | 0 to 8 |  |

Generally the density is 2.51–2.65 g/cm$^3$; the index of refraction is 1.56 to 1.630; and the Abbe number is 45–55.

DETAILED DISCUSSION

The composition of this invention is characterized by the combination of the components $P_2O_5$ with $TiO_2$ as well as $Al_2O_3$ and $SiO_2$. Together these make up at least 50% by weight of the glass with $TiO_2$-concentrations between 4 and 12% by weight. $B_2O_3$ and $ZrO_2$ as well as the other mentioned oxides may be added in the stated defined amounts. The alkaline earth metal oxides should amount to at least 2% by weight. Strontium and barium oxides are fully equivalent to magnesium oxide in the alkaline earth family. The alkali metal oxides are needed for chemical hardening by ion-exchange. The combined content of $Na_2O$ and $K_2O$ should be 4 to 15% by weight.

Oxides other than those specifically mentioned here may be added in quantities up to 12% by weight. These oxides are usually fully conventional refining agents, e.g., reducing agents such as SnO, $As_2O_3$, $Sb_2O_3$ etc. or U.V. absorbing oxides. The ultra-violet absorption, caused by small additions of e.g., cerium- and/or tin-oxide, produces an absorption limit or discontinuity in the glass at approximately 350 nm (50% transmission). By appropriate doping, this UV limit can be relocated and tailored appropriately, e.g., placed in such a position that at 313 nm there is 0% transmission for a glass thickness of 2 mm and at 362 nm 80% transmission. Depending on the composition of the basic glass, the appropriate doping rate is 0.01 to 2.0% by weight to achieve substantially no transmission below 350 nm.

Other metal oxides which may be added in quantities up to 12% by weight as mentioned above are components useful for adjusting specific properties such as index of refraction, dispersion, hardness, hue, etc. Examples of these additional oxides are PbO, $Bi_2O_3$, $Y_2O_3$, $Yb_2O_3$, $TeO_2$, CoO, $La_2O_3$, which can be added individually in amounts up to 2% by weight.

It is preferred that the total amount of $P_2O_5$, $Al_2O_3$ and $SiO_2$ is 47 to 87 wt %. The total amount of $ZrO_2$ and $TiO_2$ is 4–12 wt %; of CaO and MgO is 2–18 wt %; and of $Na_2O$ and $K_2O$ is 4–15 wt %. It is also preferred that the weight ratio of $P_2O_5:Al_2O_3$ be equal to or greater than 0.50, e.g., 0.50–1.50. It is also preferred that the total of CaO, MgO and ZnO be 2–18 wt %.

Throughout the foregoing, for all elements of possible 0 wt % content, when they are present in the glass, any finite amount is possible, e.g., 0.001, 0.01, 0.1 wt % etc. As to the stated end points, each can be varied inside its respective range by sequential increases, e.g., of 0.05 wt %.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example(s), all temperatures are set forth uncorrected in degrees Celsius; unless otherwise indicated, all parts and percentages are by weight.

The properties of the glasses of the Examples were determined as follows.

Refractive index $n_d$ and Abbe number were fully conventionally measured using an Abbe refractometer. Crystallization was determined in accordance with the 'carrierplate'-method and density by means of a mohr balance. Ultra-violet absorption was determined by measuring transmission in 4 mm thick samples, chemical hardening (ion-exchange) by photoelastic (voltage optical) measurements of layer-thickness in the exchange zone and of compression stress in this zone. Chemical stability was measured by the standard acid-resistance test.

EXAMPLE 1

The following components are weighed out: 62.09 g of clean sand, 14.17 g of $H_2BO_3$, 122.42 g of AlO(OH), 120.00 g of $P_2O_5$, 8.03 g of zirconium oxide, 32.22 g of titanium oxide, 60.50 g of $CaCO_3$, 96.14 g of soda and 0.80 g of cerium oxide.

The powder is intimately mixed and fed into a 4 l platinum curcible at 1430° C., melted down at 1460° C. and homogenized by stirring at 1450° C. Through a discharge pipe in the bottom of the crucible, the glass is then cooled in the pipe to a temperature which corresponds to a viscosity of $10^3$ dpas. The glass emerges from the pipe in a cuttable state without crystallization tendencies and may then be pressed into lens-blanks of 60 cm diameter and 6 mm thickness. After grinding and polishing these blanks to produce spectacle lenses—in course of which treatments no problems are encountered either during washing or during the removal of dereflections by acid treatment—an inorganic spectacle-lens glass is obtained with $n_d=1.5$, and Abbe-number of 48 and a density of 2.51 $gcm^{-3}$. By comparison with plastic lenses it has clearly apparent cosmetic advantages. After chemical hardening by ion-exchange in a $KNO_3$ salt bath at 435° C. it also has advantages in fracture properties and in tensile strength. Moreover, due to its absorption in the UV range of the spectrum, it complies with the latest opthalmic requirements in that regard.

Table 1 shows the properties of other glasses of this invention prepared in similar fashion.

TABLE 1

|  | 2<br>19087 | 3<br>19105 | 4<br>19113 | 5<br>19107 | 6<br>19108 | 7<br>19109 | 8<br>19083 | 9<br>19127 |
|---|---|---|---|---|---|---|---|---|
| $P_2O_5$ | 30.00 | 14.0 | 14.0 | 32.2 | 13.0 | 17.6 | 30.00 | 16.00 |
| $Al_2O_3$ | 24.00 | 27.0 | 22.0 | 23.6 | 26.6 | 25.0 | 24.00 | 26.00 |
| $SiO_2$ | 11.50 | 19.0 | 19.0 | 11.0 | 17.5 | 20.0 | 15.5 | 20.00 |
| $B_2O_3$ | 2.00 | 8.0 | 7.5 | — | 14.8 | 12.0 | 2.0 | 6.00 |
| MgO | — | 1.0 | — | — | — | — | — | — |
| CaO | 8.50 | 11.5 | 10.0 | 10.5 | 12.0 | 12.4 | 8.5 | 5.40 |
| SrO | — | — | — | — | 0.4 | — | — | — |
| ZnO | — | — | — | — | — | — | — | 7.00 |
| $TiO_2$ | 8.00 | 6.2 | 3.0 | 8.8 | 6.1 | 8.0 | 8.0 | 6.00 |
| $ZrO_2$ | 2.00 | 1.3 | 1.3 | 0.9 | — | 0.3 | 2.0 | 1.90 |
| $Nb_2O_5$ | — | — | 10.00 | — | — | 0.10 | — | 1.00 |
| $Ce_2O_3$ | 0.21 | — | — | 0.07 | 0.05 | — | — | — |
| $Li_2O$ | — | — | — | — | — | — | — | 4.00 |
| $Na_2O$ | 13.79 | 11.60 | 11.82 | 4.0 | 5.0 | 1.5 | 14.0 | 4.00 |
| $K_2O$ | — | — | — | 9.0 | 5.0 | 2.5 | — | 1.00 |
| $SnO_2$ | — | 0.40 | 0.18 | — | — | 0.62 | — | — |
| $As_2O_3$ | — | 0.20 | 0.20 | — | — | 0.20 | 0.3 | 0.20 |
| F | — | — | 1.00 | 0.30 | 0.25 | — | — | 1.50 |
| $n_d$ | 1.567 | 1.566 | 1.591 | 1.567 | 1.568 | 1.569 | 1.562 | 1.570 |
| $v_d$ | 46.0 | 47.8 | 49.5 | 45.3 | 48.5 | 46.1 | 46.9 | 46.0 |
| $\rho(gcm^{-3})$ | 2.58 | 2.61 | 2.63 | 2.63 | 2.54 | 2.55 | 2.64 | 2.61 |

The preceding example(s) can be repeated with similar success by substituting the generically or specifically described reactants and/or operating conditions of this invention for those used in the preceding example(s).

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An alumina-silica-phosphate spectacle glass which is colorless in the visible range, has a density of less than about 2.65 gcm$^{-3}$, an Abbe number equal to or greater than about 45 and a refractive index $n_d$ greater than about 1.56, and consisting essentially of (in % by weight):

| | |
|---|---|
| $P_2O_5$ | 12 to 40 |
| $Al_2O_3$ | 13 to 34 |
| $SiO_2$ | 8 to 30 |
| Total of $P_2O_5$, $Al_2O_3$ and $SiO_2$ | 47 to 87 |
| $B_2O_3$ | 0 to 16 |
| $ZrO_2$ | 0 to 4 |
| $TiO_2$ | 3 to 12 |
| Total of $ZrO_2$ and $TiO_2$ | 4 to 12 |
| CaO | 2 to 18 |
| MgO | 0 to 4 |
| Total of CaO and MgO | 2 to 18 |
| $Na_2O$ | 0 to 15 |
| $K_2O$ | 0 to 11 |
| Total of $Na_2O$ and $K_2O$ | 4 to 15 |
| $Li_2O$ | 0 to 6 |
| $Nb_2O_5$ | 0 to 12 |
| ZnO | 0 to 8 |
| Refining agent oxides U.V. absorption agent oxides, and other properties adjustment oxides | 0 to 12. |

2. A spectacle glass of claim 1, of the composition (in % by weight):

| | |
|---|---|
| $P_2O_5$ | 12 to 34 |
| $Al_2O_3$ | 21 to 29 |
| $SiO_2$ | 10 to 24 |
| $B_2O_3$ | 0 to 15 |
| MgO | 0 to 2 |
| CaO | 6 to 12 |
| $TiO_2$ | 5 to 11 |
| $ZrO_2$ | 0 to 3 |
| $Na_2O$ | 1 to 15 |
| $K_2O$ | 1 to 10 |
| $Nb_2O_5$ | 1 to 12 |

3. A spectacle glass of claim 1, wherein the weight ratio of $P_2O_5$:$Al_2O_3$ is greater than or equal to 0.50.

4. A spectacle glass of claim 1, wherein the sum of CaO, MgO and ZnO is 2 to 18% by weight.

5. A spectacle glass of claim 1 containing 0.01 to 2.0 wt. % of a U.V. absorption agent.

6. A spectacle glass of claim 5 wherein the U.V. absorption agent is $Ce_2O_3$ or $SnO_2$.

7. A spectacle glass of claim 1 containing a refining agent which is $As_2O_3$, $Sb_2O_3$ or SnO.

8. A spectacle glass of claim 1 having substantially no transmission below 350 nm.

9. In an eyeglass lens consisting essentially of spectacle glass, the improvement wherein the spectacle glass is that of claim 1.

* * * * *